United States Patent [19]

O'Meara

[11] Patent Number: 4,736,382
[45] Date of Patent: Apr. 5, 1988

[54] ACOUSTO-OPTICAL LASER ISOLATOR

[75] Inventor: Thomas R. O'Meara, Malibu, Calif.

[73] Assignee: Hughes Aircraft Company, Los Angeles, Calif.

[21] Appl. No.: 4,408

[22] Filed: Jan. 20, 1987

[51] Int. Cl.$^4$ .................................................. H01S 3/13
[52] U.S. Cl. ...................................... 372/32; 372/703; 372/94; 372/28; 372/20; 372/9; 350/358
[58] Field of Search ................ 372/9, 94, 32, 13, 19, 372/22, 29, 33, 703, 20; 350/358

[56] References Cited

U.S. PATENT DOCUMENTS

| | | | |
|---|---|---|---|
| 3,928,814 | 12/1975 | Feichtner | 372/20 |
| 4,028,636 | 6/1977 | Hughes | 372/20 |
| 4,332,441 | 6/1982 | Margolis | 350/358 |
| 4,390,247 | 6/1983 | Freyre | 372/700 |
| 4,460,250 | 7/1984 | Freyre et al. | 350/358 |
| 4,586,184 | 4/1986 | Hess | 350/358 |

OTHER PUBLICATIONS

N. Uchida et al., "Acoustooptic Deflection Materials and Techniques," Proceedings of the IEEE, vol. 61, No. 8, Aug. 1973, pp. 1073 thru 1092.

Primary Examiner—Léon Scott, Jr.
Attorney, Agent, or Firm—V. D. Duraiswamy; A. W. Karambelas

[57] ABSTRACT

An acousto-optical isolator for isolating unwanted, backwardly propagating laser beams. The isolator includes a first Bragg cell to shift the frequency of a desired, forwardly propagating beam by a first step, a second Bragg cell to shift the frequency by a second, converse step back to its original value, and an attenuator between the two Bragg cells. The frequency of a backwardly propagating beam is shifted by the second step in the second cell and then is shifted back to its original value in the first cell. The attenuator attenuates a signal having a frequency equal to the original beam frequency shifted by the second step. Accordingly, the backwardly propagating beam is attenuated but the forwardly propagating one is not. Using dual-transducer Bragg cells, the preferred direction of propagation can rapidly be reversed.

36 Claims, 2 Drawing Sheets

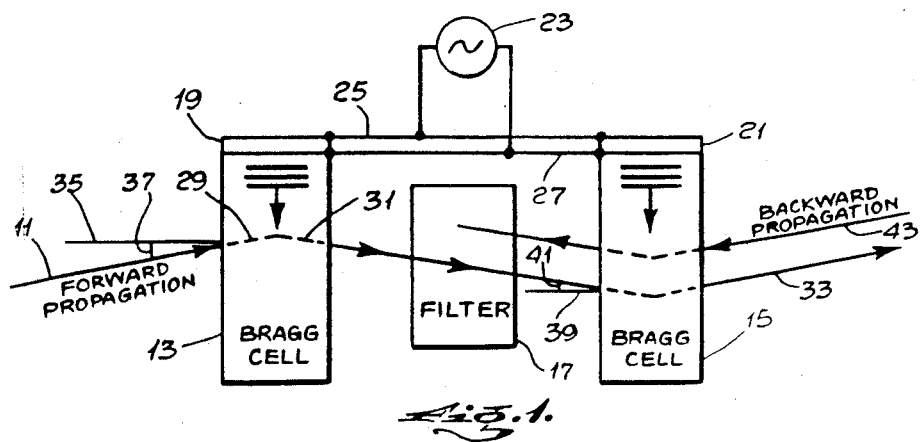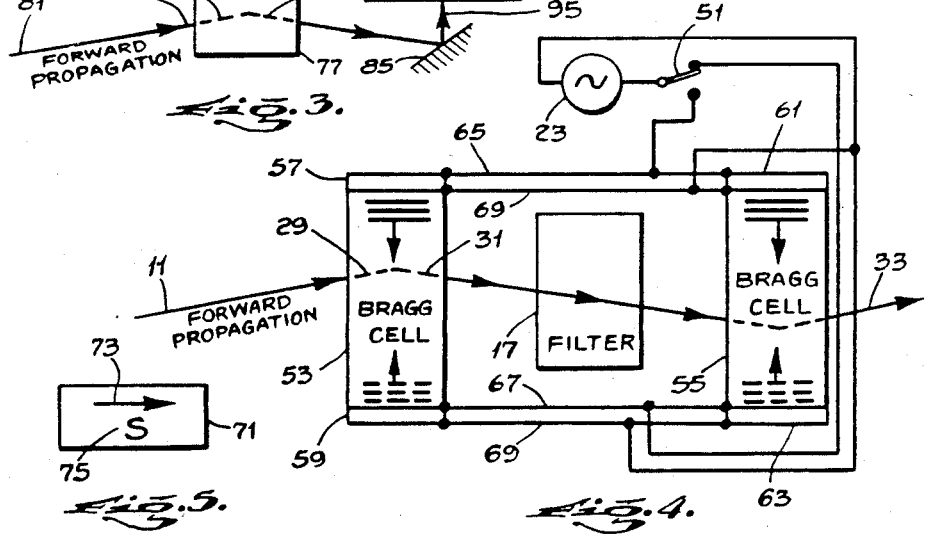

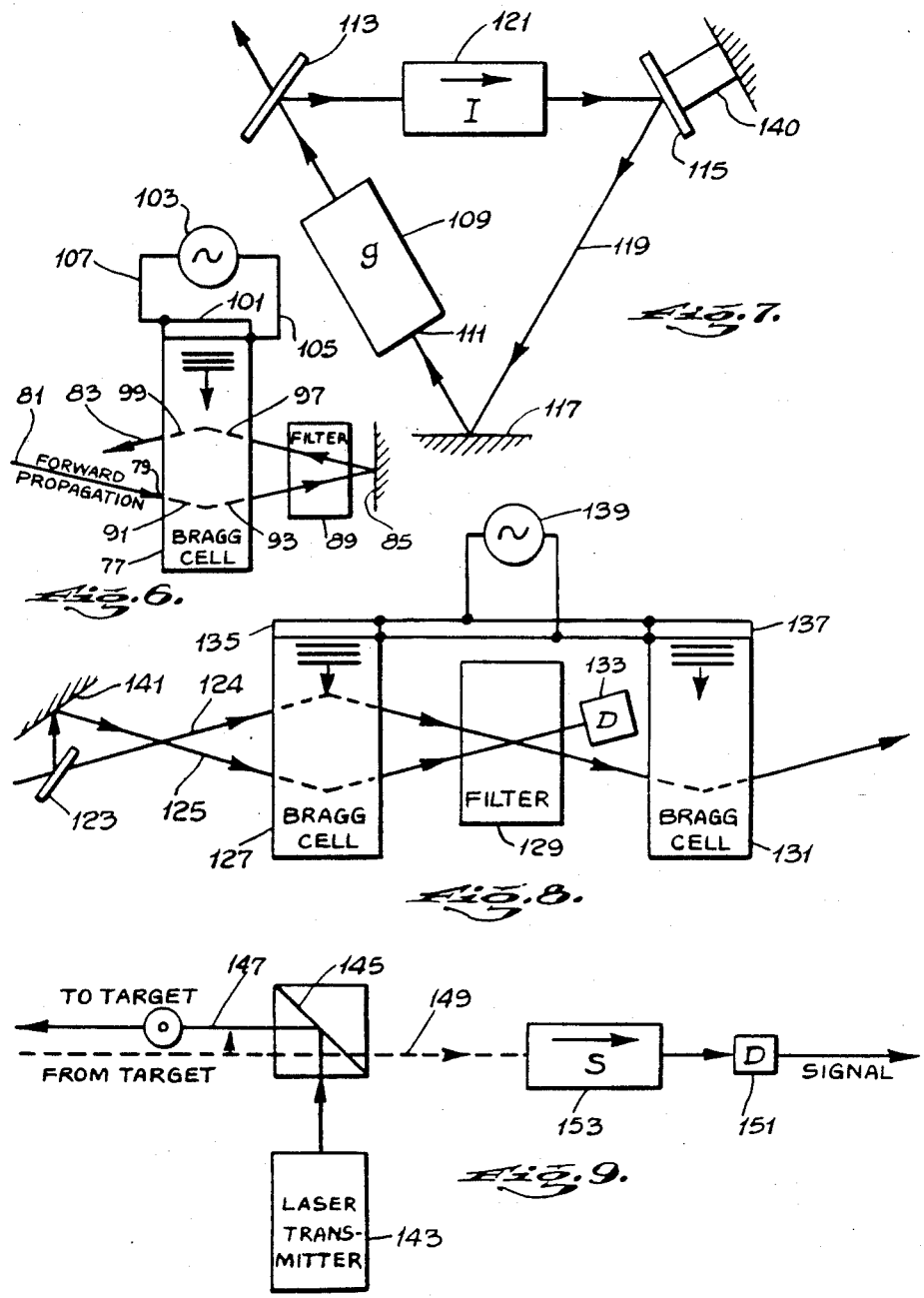

ACOUSTO-OPTICAL LASER ISOLATOR

BACKGROUND OF THE INVENTION

1. Field of the Invention

The present invention relates generally to laser systems and more particularly to directional optical isolators.

2. Description Of The Related Art

It is frequently necessary to isolate from a desired laser beam an unwanted laser beam characterized by a frequency similar to the frequency of the desired beam but propagating in a direction opposite to the direction of the desired beam. For example, under certain conditions a laser beam that propagates around a ring oscillator in the wrong direction can interfere with proper operation of the oscillator, and it is therefore necessary to isolate and thereby suppress such a backwardly propagating beam without interfering with a beam propagating forwardly around the ring.

Isolation of an unwanted, backwardly propagating laser beam can sometimes be achieved by means of a magneto-optic isolator (also known as a Faraday isolator). Such isolators are used, for example, to control parasitic laser feedback. However, magnetooptic isolators are characterized by relatively slow switching speeds and hence are not suitable for use in devices requiring reversible isolators which can be switched rapidly back and forth between isolating a laser beam propagating in one direction and isolating a beam propagating in an opposite direction. In addition, magneto-optic isolators are relatively inconvenient because they often require powerful magnetic fields and large electromagnets.

Accordingly, there is a need for an optical isolator which can be rapidly switched from isolating a laser beam propagating in one direction to isolating a beam propagating in the other direction and which does not need bulky magnets in order to function properly.

SUMMARY OF THE INVENTION

The present invention provides an acousto-optical isolator having the capability of being switched rapidly from isolation of a laser beam propagating in one direction to isolation of a beam propagating in the opposite direction and requiring relatively little operating power.

The invention accomplished this desirable result by shifting the frequency of a forwardly propagating beam so that it is not attenuated by an attenuation means while a backwardly propagating beam, which is frequency shifted in the inverse order to the forward beam is attenuated by the attenuation means, thereby isolating the backwardly propogating beam.

An acousto-optical isolator according to the present invention includes first frequency shift means to receive a laser beam having a predetermined frequency and shift the frequency of the beam by a first amount; second frequency shift means to receive the beam and shift its frequency by a second amount, the second amount being the converse of the first; and attenuation means between the two frequency shift means.

The frequency of a forwardly propagating laser beam is shifted by the first amount as the beam propagates through the first shift means and then is shifted back to its original value as the beam propagates through the second shift means. Conversely, a backwardly propagating laser beam passes through the shift means in the reverse order, and its frequency is shifted by the second amount as it passes through the second shift means and then is shifted back to its original value as it passes through the first shift means.

The attentuation means attenuates a laser beam having a frequency equal to the predetermined frequency shifted by the second amount, but it has no significant effect on a beam having a frequency equal to the predetermined frequency shifted by the first amount. Thus, the attenuation means attenuates an unwanted, backwardly propagating beam because the frequency of the backwardly propagating beam has been shifted by the second amount before the beam reaches the attenuation means, but a forwardly propagating beam is not attenuated because its frequency has been shifted by the first amount before it reaches the attenuation means. The attenuation of the unwanted beam effectively isolates it from the forwardly propagating beam.

Bragg cells, for example tellurium dioxide cells, may be used for the frequency shift means. The attenuation means may comprise a gas or a Fabry-Perot resonator, and it may either absorb or reflect selected bands of frequencies.

Means to selectively reverse the action of both frequency shift means can be included whereby the acousto-optical isolator can be switched so that is isolates a forwardly propagating beam rather than a backwardly propagating one. Dual-transducer Bragg cells can be used as the frequency shift means in such a reversible isolator.

In an alternate embodiment, a single frequency shift means may be used in combination with a reflector, whereby a laser beam passes through the single shaft means along two different paths.

An isolating ring laser oscillator embodying the invention provides an oscillator having the capability to isolate and thereby suppress any stray laser beams that might propagate backwardly around the ring path of the oscillator. An automatic frequency-stabilizing feature can conveniently be added to such an oscillator by using the attenuator to derive an error signal and then turning the oscillator to minimize the error signal.

A laser radar system having a reversible acousto-optical isolator embodying the present invention is characterized by an improved signal-to-noise ratio and immunity to nearby back-scattered transmitter pulses which could otherwise saturate or even destroy the receiver and render the system unresponsive to a received signal.

It will be appreciated from the foregoing that an acousto-optical isolator according to the present invention represents a significant advance in the field of optical isolators.

Other features, purposes, and advantages of the present invention will become apparent from the following more detailed description taken in conjunction with the accompanying drawings.

BRIEF DESCRIPTION OF THE DRAWINGS

FIG. 1 is a schematic diagram of a dual Bragg cell acousto-optical isolator according to the present invention;

FIG. 2 is a schematic symbol for representing the isolator of FIG. 1;

FIG. 3 is a schematic diagram of a single Bragg cell acousto-optical isolator according to the present invention;

FIG. 4 is a schematic diagram of a reversible acousto-optical isolator having two dual-transducer Bragg cells according to the present invention;

FIG. 5 is a schematic symbol for representing the reversible isolator of FIG. 4;

FIG. 6 is a schematic diagram of a sigle Bragg cell acousto-optical isolator like that of FIG. 3 but having only a single reflector.

FIG. 7 is a schematic diagram of an isolating ring laser oscillator according to the present invention;

FIG. 8 is a schematic diagram of an acousto-optical isolator similar to that shown in FIG. 1 but also including a light-sensitive detector for providing a frequency error signal for use in an isolating ring laser oscillator similar to that shown in FIG. 7; and FIG. 9 is a schematic diagram of a laser radar including a reversible acousto-optical isolator like that shown in FIG. 4.

DESCRIPTION OF THE PREFERRED EMBODIMENT

Optical isolators have been characterized by relatively high power consumption and relatively slow switching speeds. As shown in the exemplary drawings, an acousto-optical isolator according to the present invention requires relatively little power and can be switched raidly from isolation in one direction to isolation in an opposite direction.

An isolator according to the present invention isolates, from a desired laser beam having a predetermined frequency and propagating forwardly along a predefined path 11, any unwanted, backwardly propagating laser beam having a like frequency, as shown in FIG. 1. A first frequency shift means 13 is disposed to receive a laser beam propagating along the path 11 and is operative to shift the frequency of any received beam by a first amount. A second frequency shift means 15 is disposed forwardly of the first shift means 13 to receive a laser beam propagating along the path 11 and is operative to shift the frequency of any received beam by a second amount, which second amount is the converse of the first.

An attenuation means 17 is disposed between the shift means 13 and 15 to receive any laser beam propagating either forwardly or backwardly therebetween. The attenuation means 17 is for attenuating any beam having a frequency equal to the predetermine frequency shifted by the second amount whereby any unwanted, backwardly propagating beam is attenuated and is thereby isolated from the desired beam.

In operation, the frequency of the desired, forwardly propagating beam is shifted by the first amount as the beam propagates through the first shift means 13 and then is shifted back to the predetermined frequency as the beam propagates through the second shift means 15. The frequency of any unwanted, backwardly propagating beam is shifted by the second amount as the beam propagates through the second shift means 15 and then is shifted back to the predetermined frequency as the beam propagates through the first shift means 13.

The first frequency shift which occurs in the first shift means 13 may comprise an upward shift in frequency by a predetermined amount, and if so then the second freqeuncy shift which occurs in the second shift means 15 will comprise a downward shift in frequency by a like amount. Conversely, the step frequency shift which occurs in the first shift means 13 may comprise a downward shift in frequency by a predetermined amount, and if so then the second frequency shift which occurs in the second shift means 15 will comprise an upward shift in frequency by a like amount.

For example, if the first shift were to comprise an upward shift of 0.15 gighertz ("GHz"), then the second shift would comprise a downward shift of 0.15 GHz and the frequency of a forwardly propagating beam having an initial frequency of, for example, 300,000.00 GHz would be shifted up in the first shift means 13 by 0.15 GHz to a frequency of 300,000.15 GHz and then would be shifted back down to 300,000.00 GHz in the second shift means 15. Conversely, the frequency of a backwardly propagating beam having the same initial frequency of 300,000.00 GHz would be shifted down to 299,999.85 Ghz in the second shift means 15 and then would be shifted back up to 300,000.00 GHz in the first shift means 13.

In the foregoing example, isolation of the backwardly propagating beam would be accomplished by using for the attenuation means 17 an attenuator which has little or no effect on a laser beam having a frequency of 300,000.15 GHz but which significantly attenuates a beam having a frequency of 299,999.85 Ghz. The forwardly propagating beam would not be significantly attenuated as it propagates through such an attenuator, but the backwardly propagating beam would be attenuated and thereby isolated from the forwardly propagating beam.

If the first shift comprises an upward shift in frequency, the attenuation means 17 may comprise a high-pass filter that attenuates frequencies lower than the predetermined frequency of the laser beam. If the first shift comprises a downward shift, the attenuation means 17 may comprise a low-pass filter that attenuates frequencies higher than the predetermined frequency. The attenuation means 17 may comprise a notch filter that attenuates a band of frequencies which includes that frequency which equals the predetermined frequency shifted by the second amount or it may comprise a bandpass filter that attenuates all frequencies except those in a band which includes that frequency which equals the predetermined frequency shifted by the first amount. The attenuation means 17 may either absorb or reflect selected bands of frequencies. It may or may not attenuate the predetermined frequency itself, according to the needs of the particular task to be performed.

The attenuation means 17 may comprise a gas, such as a rate earth gas, that attenuates some optical frequencies but not others. It may instead comprise a Fabry-Perot resonator or some other suitable means for attenuating an appropriate frequency or band of frequencies according to the needs of the task at hand.

The first shift means 13 may comprise a Bragg cell having a transducer 19, and the second shift means 15 may comprise a Bragg cell having a transducer 21. A signal means 23 such as a signal generator is operative to provide an energizing signal to the Bragg cells 19 and 21 through connecting leads 25 and 27. Various kinds of commercially available Bragg cells may be used. A Bragg cell that will give good results comprises tellurium dioxide, as described by N. Uchida and N. Niizeki in "Acoustooptic Deflection Materials and Techniques," Proceedings of the IEEE, Vol. 61, No. 8, pages 1073-1092.

The predefined propagation path 11 comprises a first portion 29, leading into the first shift means 13; a second portion 31, leading out of the first shift means 13, through the attenuation means 17, and into the second shift means 15; and a third portion 33, leading out of the second shift means 15. The first portion 29 defines, with a line 35 perpendicular to the shift means 13, a first angle of incidence 37 where it enters the shift means 13. If the shift means 13 comprises a Bragg cell, then the angle 37 is called the Bragg angle and is selected according to the predetermined frequency of the beam. The second portion 31 of the path 11 defines, with a line 39 perpendicular to the second shift means 15, a second angle of incidence 41 that is equal in magnitude to the angle 37. The direction of the angle 37 as measured from the perpendicular line 35 determines whether the shift means 13 is operative to shift the frequency of the beam upward or downward. The direction of the angle 41 is opposite from the direction of the angle 37, whereby if the first shift means 13 shifts the frequency up, the second shift means 15 shifts it down, and vice versa.

For convenience of illustration, a backwardly propagating beam is shown as following a displaced path 43 parallel to the third portion 33 of the path 11 into the second shift means 15 and thence parallel to the second portion 31 into the attenuation means 17, but in the usual case a backwardly propagating beam would propagate backwardly along said portion of the path 11 rather than along such a displaced path 43. The path 43 is shown as disappearing within the attenuation means 17, as would be the case if the attenuation means 17 were able to totally attenuate a backwardly propagating beam, but often only a partial attenuation takes place and in that case the attenuated backwardly propagating beam would continue backward along the path 11 through the first shift means 13.

The isolator may include means, such as a switch (not shown) in series with the signal means 23, to deactivate the frequency shift means.

A schematic symbol for representing the above-described isolator comprises a box 45 containing an arrow 47 indicative of the direction of a forwardly propagating beam therethrough and an upper case letter "I" 49 below the arrow 47, as shown in FIG. 2.

A reversible isolator, similar to the above-described isolator as shown in FIG. 1 but with the addition of a reversing feature, is shown in FIG. 4. For convenience, components in FIG. 4 that are similar to components in FIG. 1 are assigned the same reference numerals.

The reversible isolator comprises control means 51 to reverse both a first reversible frequency shift means 53 and a second reversible frequency shift means 55 such that, when reversed, the fist shift means 53 shifts the frequency of a beam propagating therethrough by the second amount and the second shift means 55 shifts the frequency of a beam propagating therethrough by the first amount, the attenuation means 17 being operative when the shift means 53 and 55 have been reversed to attenuate a forwardly propagating beam rather than a backwardly propagating beam.

The first reversible shift means 53 may comprise a dual-transducer Bragg cell having a first transducer 57, similar to the transducer 19 as shown in FIG. 1, for forward operation and a second transducer 59 for reverse operation. In like fashion, the second shift means 55 may comprise a dual-transducer Bragg cell having a first transducer 61 for forward operation and a second transducer 63 for reverse operation. A signal from the signal means 23 is switched by the control means 51 either to the first transducers 57 and 61 through a lead 65 or to the second tranducers 59 and 63 through a lead 67. A lead 69 provides a common return to the signal means 23.

The control means 51 may comprise a simple mechanical switch or it may comprise a solid state switching element that may be under the control of some other device such as a laser radar transmitter or a computer. The control means 51 may also comprise means, such as an additional switch contact (not shown) for deactivating the frequency shift means by disconnecting the signal means 23.

A schematic symbol for representing the above-described reversible isolator comprises a box 71 containing an arrow 73 indicative of the direction of a forwardly propagating beam therethrough and an upper case letter "S" 75 below the arrow 73, as shown in FIG. 5.

An isolator using only a single frequency shift means 77 is shown in FIG. 3. The frequency shift means 77 is disposed to receive a laser beam propagating either forwardly or backwardly along a first portion 79 of a predefined path 81 and is operative to shift the frequency thereof by a first amount. The shift means 77 is also disposed to receive a laser beam propagating either forwardly or backwardly along a second portion 83 of the predefined path 81 and is operative to shift the frequency thereof by a second amount, which second amount is converse of the first.

Reflecting means 85 and 87 are disposed forwardly of the shift means 77 along the first portion 79 of the path 81 to reflect a beam propagating forwardly along the first portion 79 onto the second portion 83 of the path 81 and thence forwardly along the second portion 83. The reflecting means 85 and 87 can also reflect a backwardly propagating beam from the second portion 83 of the path 81 onto the first portion 79 of the path 81 and thence backwardly therealong.

The frequency of the desired, forwardly propagating beam is shifted by the first amount as the beam propagates through the shift means 77 along the first portion 79 of the path 81 and then is shifted back to the predetermined frequency as the beam propagates through the shift means 77 along the second portion 83 of the path 81 after having been reflected from the first portion 79 onto the second portion 83 by the reflecting means 85 and 87.

In like manner, the frequency of any unwanted, backwardly propagating beam is shifted by the second amount as the beam propagates through the shift means 77 along the second portion 83 of the path 81 and then is shifted back to the predetermined frequency as the beam propagates through the shift means 77 along the first portion 79 of the path 81 after having been reflected from the second portion 83 onto the first portion 79 by the reflecting means 85 and 87.

Attenuation means 89, similar to the attenuation means 17 as described above, is disposed to receive any beam that has had its frequency shifted by either the first amount or the second amount. The attenuation means 89 is for attenuating any beam having a frequency equal to the predetermined frequency shifted by the second amount whereby any unwanted beam is attenuated and is thereby isolated from the desired beam.

In the embodiment shown, the first portion 79 of the path 81 has a first segment 91 entering the shift means 77 and a second segment 93 extending from the shift means 77 to the reflecting means 85. A third portion 95 of the path 81 extends from the reflecting means 85 to the reflecting means 87. A first segment 97 of the second portion 83 of the path 81 extends from the reflecting means 87 to the shift means 77, and a second segment 99 of the second portion 83 leads out of the shift means 77. A forwardly propagating beam traverses, in order, the first segment 91 and the second segment 93 of the first portion 79, then the third portion 95, then the first segment 97 and the second segment 99 of the second portion 83. A backwardly propagating beam traverses the portions and segments of the path 81 in the reverse order.

In the embodiment shown, the attenuation means 89 is disposed between the reflecting means 85 and 87 along the third portion 95 of the path 81. However, the attenuation means 89 could instead be disposed between the shift means 77 and the reflecting means 85 along the second segment 93 of the first portion 79. The attenuation means 89 could also be disposed between the shift means 77 and the reflecting means 87 along the first segment 97 of the second portion 83.

The frequency shift means 77 may comprise a Bragg cell having a transducer 101. A signal means 103 provides an energizing signal to the Bragg cell through leads 105 and 107. A dual-transducer Bragg cell and a control means may be utilized to provide a reversible feature.

The reflecting means 85 and 87 may comprise mirrors or other suitable means that are highly reflective at the predetermined frequency of the beam.

Two reflecting means 85 and 87 are used in the embodiment illustrated in FIG. 3. However, the number of reflecting means may be varied according to the task to be performed. An alternative embodiment utilizing only a single reflecting means 85 is shown in FIG. 6. In this embodiment, the attenuation means 89 is disposed between the reflecting means 85 and the shift means 77.

A forwardly propagating beam propagates into the shift means 77 along the first segment 91 of the first portion 79 of the path 81, thence along the second segment 93 through the attenuation means 89 to the reflecting means 85. The reflecting means 85 reflects the beam onto the first segment 97 of the second portion 83 of the path 81, whence the beam propagates back through the attenuation means 89 into the shift means 77. The beam then propagates out of the shift means 77 along the second segment 99 of the second portion 83 of the path 81. A backwardly propagating beam follows the same path 81 in the reverse order.

Since the beam propagates through the attenuation means 89 two times, any undesired beam will be attenuated more completely than it would be if it only passes through the attenuation means 77 once.

An isolating ring laser oscillator embodying the present invention includes amplifier means 109 having an input 111 for receiving and amplifying a forwardly propagating laser beam of predetermined frequency, as illustrated in FIG. 7. A plurality of reflector means 113, 115 and 117 are disposed to receive the amplified beam from the amplifier 109 and reflect the beam around the amplifier 109 along a primary path 119 and back into the input 111 for further amplification. An acousto-optical isolator 121 similar to the one previously described and illustrated in FIG. 1 isolates from the forwardly propagating beam any unwanted oppositely-directed beam of like frequency. Although the isolator 121 may not totally eliminate a backwardly propagating beam, the isolator 121 will attenuate it, and frequently a small attenuation will be enough to eliminate any adverse effects of the backwardly propagating beam.

The amplifier 109 may comprise a gas laser amplifier, as illustrated. The reflecting means 113 may comprise a partially reflective mirror whereby only a portion of the beam is reflected around the path 119 and the remaining portion of the beam, comprising an output laser beam, passes through the reflecting means 113 and out of the ring oscillator.

A frequency-stabilized isolating ring laser oscillator is similar to the ring oscillator as described and illustrated but with the addition of a frequency stabilizing feature. In particular, a frequency-stabilized oscillator includes an acousto-optical isolator similar to that described and illustrated in FIG. 1 but also comprising beam splitting means 123 disposed along the primary path 124 of a forwardly propagating beam, as illustrated in FIG. 8. The beam splitting means 123 deflects a portion of the amplified laser beam from the primary path 124 onto a secondary path 125. A first frequency shift means 127, similar to the shift means 13 shown in FIG. 1, is disposed to receive a beam propagating along the primary path 124. The shift means 127 shifts the frequency of such a beam as previously described. The shift means 127 is also disposed to receive the portion of the beam propagating along the secondary path 125, and the shift means 127 shifts the frequency thereof by the second amount. An attenuation means 129 is disposed across both the primary path 124 and the secondary path 125 to receive a beam propagating out of the shift means 127 along either path. A second shift means 131, similar to the shift means 15 of FIG. 1, is disposed across the primary path 124 forwardly of the attentuation means 129 and functions similarly to the shift means 15.

The attenuation means 129 attenuates the beam propagating forwardly along the secondary path 125, just as it attenuates a beam propagating backwardly along the primary path 124. A detector means 133 is disposed across the secondary path 125 between the attenuation means 129 and the second frequency shift means 131 and receives the attenuated portion of the amplified beam on the secondary path. The detector means 133 is responsive to this attenuated portion of the beam to provide a frequency error signal having a magnitude proportional to the magnitude of the attenuated beam.

The attenuation means 129 comprises, for example, a notch filter having maximum attenuation at a frequency equal to the desired frequency of oscillation shifted by the second amount. Accordingly, the frequency error signal will assume a minimum value when the actual frequency of the ring oscillator coincides with the desired frequency, and the oscillator can be made to oscillate at the desired frequency by tuning it until the frequency error signal reaches said minimum value. Means such as a dither stabilized servo system (not shown) is responsive to the frequency error signal to correct the frequency of the oscillator. The oscillator frequency may be corrected by means such as a piezoelectrically tunable mirror unit 140 comprised in the relfecting means 115, as shown in FIG. 7.

The shift means 127 and 131, similarly to the shift means 13 and 15, may comprise Bragg cells having transducers 135 and 137, respectively, energized by a signal source 139. A reflector 141 may be utilized to reflect the deflected portion of the amplified laser beam from the splitter 123 onto the secondary path 125.

A noise-isolating laser radar system embodying the invention includes a switchable acousto-optical isolator, as shown in FIG. 9. The radar system includes transmitter means 143 to provide a pulsed laser beam having a predetermined frequency and means 145 to direct the pulsed laser beam toward a target (not shown) along a path 147. A portion of the beam is reflected back from the target along a reflection path 149 to a detector means 151. The detector means 151 provides a signal indicative of the reflected laser beam.

A reversible isolator 153, similar to the reversible isolator previously described and illustrated in FIG. 4, is disposed along the path 147 to receive the reflected laser beam to isolate therefrom any unwanted noise having a like frequency and propagating along the reflection path 147.

A control signal means (not shown), responsive to the transmitter means 143, generates a control signal to select the first amount shift in the first shift means of the reversible isolator and the second amount shift in the second shift means when the reflected laser beam is present and to reverse said selections when the reflected laser beam is not present. In this manner, the isolator 153 attenuates any noise of a frequency near that of the transmitted laser beam except when the reflected beam is actually present. Such noise often has a higher intensity just after the beam has been transmitted and before the reflected beam has been received than it has at other times, and hence switching the isolator to attenuate such noise until the reflected beam has returned from the target greatly improves the signal-to-noise ratio of the system and often protects the detector means 151 from possible saturation by such noise.

If the laser radar is tracking a moving target, the frequency of the reflected beam will be Doppler-shifted according to the velocity of the target. This Doppler shift may result in an unintended attenuation of the reflected beam in the reversible isolator if the amount of the Doppler shift offsets the frequency shift produced by the first frequency shift means in the isolator. To compensate for such an effect, the isolator can be switched off during reception of alternate reflected pulses. Accordingly, the control signal means (not shown) can also provide a deactivate signal following selected ones of the laser pulses. Means (not shown), such as a solid state switch as previously discussed, can be provided to deactivate both frequency shift means in response to the deactivate signal.

An acousto-optical isolator according to the present invention can isolate an unwanted, backwardly propagating laser beam from a desired forwardly propagating beam. It is characterized by low power consumption and it can rapidly be switched on and off or reversed by solid state switching elements. A ring laser oscillator embodying the present invention is not subject to performance degradation resulting from stray backwardly-propagating laser beams, and an integral frequency-stabilizing feature automatically tunes the oscillator to the desired frequency of oscillation. A laser radar system embodying the present invention has a good signal-to-noise ratio and is not subject to saturation by stray pulses. The present invention accordingly represents a significant advance in the field of laser systems.

Although one specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. An acousto-optical isolator for isolating, from a laser beam having a predetermined frequency and propagating forwardly along a predefined path, any unwanted, backwardly propagating laser beam having a like frequency, the isolator comprising:
   first frequency shift means, disposed to receive a laser beam propagating along the predefined path, for shifting the frequency of the received beam by a first amount;
   second frequency shift means, disposed forwardly of the first frequency shift means to receive a laser beam propagating along the path, for shifting the frequency of the received beam by a second amount, the second amount being the converse of the first, whereby the frequency of a forwardly propagating beam is shifted by the first amount as the the beam propagates through the first shift means and then is shifted back to the predetermined frequency as the beam propagates through the second shift means, and the frequency of any unwanted, backwardly propagating beam is shifted by the second amount as the beam propagates through the second shift means and then is shifted back to the predetermined frequency as the beam propagates through the first shift means; and
   attenuation means, disposed between the first and second shift means to receive any laser beam propagating either forwardly or backwardly therebetween, to attenuate any laser beam having a frequency equal to the predetermined frequency shifted by the second amount, whereby any unwanted, backwardly propagating beam is attenuated and is thereby isolated.

2. An isolator according to claim 1 wherein the attenuation means attenuates any laser beam having a frequency equal to the predetermined frequency.

3. An isolator according to claim 1 wherein the attenuation means comprises a gas.

4. An isolator according to claim 1 wherein the attenuation means comprises a Fabry-Perot resonator.

5. An isolator according to claim 1 wherein one of the frequency shift means comprises a Bragg cell and signal means to provide an energizing signal to the Bragg cell.

6. An isolator according to claim 5 wherein the Bragg cell comprises tellurium dioxide.

7. An isolator according to claim 1 wherein the first frequency shift means comprises a reversible frequency shift means and the second shift means comprises a reversible frequency shift means, said isolator further comprising control means to reverse the operation of both frequency shift means such that the first shift means shifts the frequency of a beam propagating therethrough by the second amount and the second shift means shifts the frequency of a beam propagating therethrough by the first amount, the attenuation means being operative when operation of both shift means has been reversed to attenuate a forwardly propagating beam rather than a backwardly propagating beam.

8. An isolator according to claim 7 wherein one of the frequency shift means comprises a dual-transducer Bragg cell and signal means operative to provide an energizing signal to the Bragg cell, and the control means comprises means to apply the energizing signal selectively to either of the transducers.

9. An isolator according to claim 1 and further comprising means to deactivate the first and second frequency shift means.

10. An acousto-optical isolator for isolating, from a laser beam having a predetermined frequency and propagating forwardly along a predefined path, any unwanted, backwardly propagating laser beam having a like frequency, the isolator comprising:

frequency shift means, disposed to receive a laser beam propagating along a first portion of the path for shifting the frequency thereof by a first amount, and disposed to receive a laser beam propagating along a second portion of the predefined path for shifting the frequency thereof by a second amount, the second amount being the converse of the first;

reflecting means, operative to reflect a forwardly propagating laser beam from a first portion of the path onto a second portion thereof and to reflect a backwardly propagating laser beam from the second portion of the path onto the first portion thereof, whereby the frequency of a forwardly propagating beam is shifted by the first amount as the beam propagates through the shift means along the first portion of the path and then is shifted back to the predetermined frequency as the beam propagates through the shift means along the second portion of the path after having been reflected from the first portion onto the second portion by the reflecting means, and the frequency of any unwanted, backwardly propagating beam is shifted by the second amount as the beam propagates through the shift means along the second portion of the path and then is shifted back to the predetermined frequency as the beam propagates through the shift means along the first portion of the path after having been reflected from the second portion onto the first portion by the reflecting means; and attenuation mean, disposed to receive any beam that is being reflected from either portion of the path onto the other and to attenuate any beam having a frequency equal to the predetermined frequency shifted by the second amount whereby any unwanted, backwardly propagating beam is attenuated and is thereby isolated from the desired beam.

11. An isolator according to claim 10 wherein the attenuation means attenuates any laser beam having a frequency equal to the predetermined frequency.

12. An isolator according to claim 10 wherein the attenuation means comprises a gas.

13. An isolator according to claim 10 wherein the attenuation means comprises a Fabry-Perot resonator.

14. An isolator according to claim 10 wherein the frequency shift means comprises a Bragg cell and signal means to provide an energizing signal to the Bragg cell.

15. An isolator according to claim 14 wherein the Bragg cell comprises tellurium dioxide.

16. An isolator according to claim 10 wherein the frequency shift means comprises a reversible frequency shift means, and further comprising control means to reverse the operation of the frequency shift means such that the shift means shifts the frequency of a beam propagating therethrough along the first portion of the path by the second amount and the frequency of a beam propagating therethrough along the second portion of the path by the first amount, the attenuation means being operative when the operation of the shift means has been reversed to attenuate a forwardly propagating beam rather than a backwardly propagating beam.

17. An isolator according to claim 16 wherein:
the frequency shift means comprises a dual-transducer Bragg cell and signal means to provide an energizing signal to the Bragg cell, and
the control means comprises means to apply the energizing signal selectively to either of the transducers.

18. An isolator according to claim 10 and further comprising means to deactivate the frequency shift means.

19. An isolator according to claim 10 wherein the attenuation means is disposed between the reflecting means and the shift means across both portions of the path.

20. An isolating ring laser oscillator comprising:
amplifier means, having an input for receiving a forwardly propagating laser beam of predetermined frequency, for amplifying the received laser beam;
a plurality of reflector means, disposed to receive the amplified laser beam from the amplifier means and to reflect the beam around the amplifier and back into the input for further amplification; and
an acousto-optical isolator for isolating from the forwardly propagating amplified laser beam any unwanted, backwardly propagating beam of like frequency, the isolator comprising:
first frequency shift means, disposed to receive the amplified laser beam and to shift the frequency thereof by a first amount;
second frequency shift means, disposed forwardly of the first shift means to receive the amplified laser beam from the first shift means and to shift the frequency thereof by a second amount, the second amount being the converse of the first amount, whereby the frequency of the amplified laser beam is shifted back to the predetermined frequency by the second shift means, and whereby the frequency of any backwardly propagating beam is shifted by the second amount as it propagates through the second shift means and then is shifted back to the predetermined frequency as it propagates through the first shift means; and
attenuation means, disposed between the first and second shift means to receive any beam propagating therebetween and to attenuate any beam having a frequency equal to the predetermined frequency shifted by the second amount whereby any backwardly propagating beam is attenuated and is thereby isolated from the amplified laser beam.

21. A ring laser oscillator according to claim 20 wherein the attenuation means comprises a gas.

22. A ring laser oscillator according to claim 20 wherein the attenuation means comprises a Fabry-Perot resonator.

23. A ring laser oscillator according to claim 20 wherein one of the frequency shift means comprises a Bragg cell and signal means to provide an energizing signal to the Bragg cell.

24. A ring laser oscillator according to claim 23 wherein the Bragg cell comprises tellurium dioxide.

25. A frequency-stabilized isolating ring laser oscillator comprising:
amplifier means, having an input for receiving a forwardly propagating laser beam of predetermined frequency to amplify the received beam;

a plurality of reflector means, disposed to receive the amplified laser beam from the amplifier means and to reflect the beam along a predefined primary path around the amplifier and back into the input for further amplification;

an acousto-optical isolator for deriving from the forwardly propagating amplified laser beam a frequency error signal, and for isolating from the beam any unwanted, backwardly propagating beam of like frequency, the isolator comprising:

beam splitting means, disposed to receive the amplified laser beam and to deflect a portion thereof onto a secondary path;

first frequency shift means, disposed across the primary and secondary paths, for shifting the frequency of a laser beam propagating along the primary path by a first amount and to shift the frequency of a laser beam propagating along the secondary path by a second amount, the second amount being the converse of the first amount;

second frequency shift means, disposed forwardly of the first shift means along the primary path to receive the amplified laser beam and to shift the frequency thereof by said second amount, whereby the frequency of the beam is shifted by the first amount as the beam propagates along the primary path through the first shift means and then is shifted back to the predetermined frequency as the beam propagates through the second shift means and the frequency of any unwanted, backwardly propagating beam is shifted by the second amount as the beam propagates through the second shift means and then is shifted back to the predetermined frequency as the beam propagates through the first shift means;

attenuation means, disposed between the shift means to receive any beam propagating therebetween and to attenuate any beam having a frequency equal to the predetermined frequency shifted by the second amount, whereby any backwardly propagating beam is attenuated and is thereby isolated and whereby a beam propagating along the secondary path is also attenuated; and detector means, disposed across the secondary path between the attenuation means and the second frequency shift means to receive the attenuated secondary beam and responsive thereto to provide a frequency error signal; and means responsive to the frequency error signal to correct the frequency of the oscillator.

26. An oscillator according to claim 25 wherein the attenuation means comprises a gas.

27. An oscillator according to claim 25 wherein the attenuation means comprises a Fabry-Perot resonator.

28. An oscillator according to claim 25 wherein one of the frequency shift means comprises a Bragg cell and signal means to provide an energizing signal to the Bragg cell.

29. An oscillator according to claim 25 wherein the Bragg cell comprises tellurium dioxide.

30. A ring laser according to claim 25 wherein the means to correct the frequency comprises a piezolectrically tunable mirror.

31. A noise-isolating laser radar comprising:

transmitter means to provide a pulsed laser beam having a predetermined frequency;

means to direct the pulsed laser beam toward a target whereby a portion of the beam is reflected back from the target along a reflection path;

a switching isolator to isolate the reflected beam from any unwanted noise energy having a like frequency and propagating along the reflection path, the isolator comprising:

first frequency shift means, disposed to receive optical energy propagating along the reflection path, responsive to a control signal to shift the frequency of the received energy selectively by a first amount or a second amount, the second amount being the converse of the first;

second frequency shift means, disposed forwardly of the first shift means to receive optical energy propagating along the reflection path, responsive to said control signal to shift the frequency of the received energy back to the predetermined frequency; and attenuation means, disposed between the shift means to receive any optical energy propagating therebetween and to attenuate any such energy having a frequency equal to the predetermined frequency shifted by the second amount whereby such energy is attenuated and is thereby isolated;

control signal means, responsive to the transmitter means to generate the control signal, the control signal selective the first amount in the first shift means and the second amount in the second shift means when the reflected laser beam is present and reversing said selections when the reflected laser beam is not present; and detector means, to provide a signal indicative of said reflected laser beam.

32. A laser radar according to claim 31 wherein the control signal means also provides a signal for deactivation following selected ones of the laser pulses, and further comprising means responsive to the signal for deactivation, for deactivating both frequency shift means during reception of said selected ones of the laser pulses.

33. An isolator according to claim 31 wherein the attenuation means comprises a gas.

34. An isolator according to claim 31 wherein the attenuation means comprises a Fabry-Perot resonator.

35. An isolator according to claim 31 wherein:

one of the frequency shift means comprises a dual-transducer Bragg cell and signal means to provide an energizing signal to the Bragg cell, and the control means comprises means to apply the energizing signal selectively to either of the transducers.

36. An isolator according to claim 31 wherein the Bragg cell comprises tellurium dioxide.

* * * * *